(12) United States Patent
Mori et al.

(10) Patent No.: US 7,927,088 B2
(45) Date of Patent: Apr. 19, 2011

(54) DIE ASSEMBLY AND PROCESS FOR PRODUCTION OF MULTILAYER EXTRUSIONS WITH THE SAME

(75) Inventors: Hiroyuki Mori, Itami (JP); Naohiko Mushiake, Itami (JP)

(73) Assignee: Sumika Color Co., Ltd., Osaka-shi, Osaka (JP)

( * ) Notice: Subject to any disclaimer, the term of this patent is extended or adjusted under 35 U.S.C. 154(b) by 292 days.

(21) Appl. No.: 11/660,512

(22) PCT Filed: Mar. 16, 2006

(86) PCT No.: PCT/JP2006/005214
§ 371 (c)(1),
(2), (4) Date: Feb. 20, 2007

(87) PCT Pub. No.: WO2006/103940
PCT Pub. Date: Oct. 5, 2006

(65) Prior Publication Data
US 2008/0018013 A1    Jan. 24, 2008

(30) Foreign Application Priority Data
Mar. 28, 2005 (JP) ................................. 2005-092272

(51) Int. Cl.
*B29C 47/06* (2006.01)
*B29C 47/22* (2006.01)
*B29C 47/36* (2006.01)

(52) U.S. Cl. ................ 425/133.1; 425/382 R; 425/463; 425/466

(58) Field of Classification Search .............. 425/133.1, 425/462, 463, 382 R, 382.4, 466; 264/172.15
See application file for complete search history.

(56) References Cited

U.S. PATENT DOCUMENTS 2,958,900 A * 11/1960 Meakin .................... 425/463
3,412,694 A * 11/1968 James et al. ............... 425/468
3,856,448 A * 12/1974 Iijima et al. ............. 425/133.1
(Continued)

FOREIGN PATENT DOCUMENTS

JP        59-81121 A       5/1984
(Continued)

OTHER PUBLICATIONS

Office Action issued on Aug. 17, 2010 for Japanese Application No. 2005-092272.

*Primary Examiner* — Joseph S Del Sole
*Assistant Examiner* — Ryan Ochylski
(74) *Attorney, Agent, or Firm* — Birch, Stewart, Kolasch & Birch, LLP

(57) ABSTRACT

In a die assembly, plural pairs of extrusion ports are set up on concentric circles different in diameter. The die assembly is also provided with a core material feeding layer which spreads in such a planar state as to be connected to all core material extruding passageways and a sheath material feeding layer which spreads in such a planar state as to be connected to all sheath material extruding passageways and the core material and the sheath material are fed through the passageways. This constitution makes it possible to set up extrusion ports in arbitrary positions corresponding to the core material feeding layer and the sheath material feeding layer which each spread in a planar state, which enables simultaneous production of more multilayer extrusions while inhibiting the enlargement of the assembly.

4 Claims, 11 Drawing Sheets

U.S. PATENT DOCUMENTS

| | | | | |
|---|---|---|---|---|
| 4,126,724 A | * | 11/1978 | Randall | 428/105 |
| 4,170,450 A | * | 10/1979 | Herrington, Jr. | 425/464 |
| 4,900,572 A | | 2/1990 | Repholz et al. | |
| 4,954,061 A | | 9/1990 | Repholz et al. | |
| 5,046,938 A | * | 9/1991 | Hirschberger | 425/133.1 |
| 5,204,120 A | * | 4/1993 | Hirschberger | 425/132 |
| 6,669,986 B1 | | 12/2003 | Mushiake et al. | |
| 2003/0107151 A1 | * | 6/2003 | Reilly et al. | 264/171.26 |

FOREIGN PATENT DOCUMENTS

| | | |
|---|---|---|
| JP | 59-164717 U | 11/1984 |
| JP | 4-052123 A | 2/1992 |
| JP | 7-100826 A | 4/1995 |
| JP | 7-171828 A | 7/1995 |
| JP | 8-313734 A | 11/1996 |
| JP | 2001-198918 A | 7/2001 |
| JP | 2003-53820 A | 2/2003 |

* cited by examiner

DIE ASSEMBLY AND PROCESS FOR PRODUCTION OF MULTILAYER EXTRUSIONS WITH THE SAME

TECHNICAL FIELD

The present invention relates to a die assembly employed for production of multilayer extrusions each having such a core-sheath structure that a core material is covered with a sheath material on the outer periphery thereof and a process for production of multilayer extrusions with the same.

BACKGROUND ART

A pellet is generally employed as a material for resin molding or the like. The pellet is prepared by heating/melting a previously blended/adjusted resin raw material for extruding the same into the form of a strand (string) and cutting the obtained resin strand into the form of a small tablet. When molding various resin products or the like, the aforementioned pellet is so prepared that the raw material may not be blended/adjusted every molding of the resin products, a stable operation can be performed, the qualities of the products are stabilized and handling such as an operation of supplying the raw material to molding equipment etc. is simplified.

While the pellet for resin molding is generally entirely molded from the same resin, a multilayer pellet or a composite pellet consisting of a plurality of material portions is also proposed. Patent Document 1 (Japanese Patent Laying-Open No. 07-171828) describes a multilayer pellet of a core-sheath structure having a core of a material rich in viscosity and a sheath of crystalline polyolefin resin having less viscosity for solving such a problem that a pellet prepared from a material rich in viscosity easily causes blocking.

Patent Document 2 (Japanese Patent Laying-Open No. 59-081121) describes a multilayer pellet of a core-sheath structure prepared by, as a method of producing a pellet from an olefin-vinyl alcohol copolymer having such small melt tension that no strand is moldable for producing a pellet, molding a multilayer strand of a core-sheath structure formed by covering the outer periphery of a core of this resin having small melt tension with resin having large melt tension and thereafter cutting the same. As a production unit, that comprising a structure supplying a sheath material to the periphery of a core material on a die head for molding the pellet is shown.

In the method of producing a multilayer pellet disclosed in each of Patent Document 1 and Patent Document 2, the molding speed for the multilayer strand must be set relatively low, in order to reliably cover the outer periphery of the core material with the sheath material when molding the multilayer strand. Therefore, productivity of the multilayer strand and the multilayer pellet is so deteriorated that the production cost for the multilayer pellet is disadvantageously increased. In order to solve this problem, Patent Document 3 (Japanese Patent Laying-Open No. 2001-198918) discloses a method of producing a pellet by simultaneously producing a plurality of multilayer strands with a die assembly comprising a plurality of die heads, i.e., extrusion ports.

In the die assembly disclosed in Patent Document 3, a plurality of core material extruding passageways 1120 are provided on a circumference, as shown in FIG. 10A. Core material extruding passageways 1120 are provided with a plurality of radial feed pipes 1110 communicating with core material extruding passageways 1120 and extending in radial directions and a main feed pipe 1130 located on the centers of radial feed pipes 1110 for supplying a core material 910 thereto, for supplying core material 910 through these pipes.

In the die assembly disclosed in Patent Document 3, further, a plurality of sheath material extruding passageways 1220 are provided on the circumference, as shown in FIG. 10B. Sheath material extruding passageways 1220 are provided with a plurality of radial feed pipes 1210 communicating with sheath material extruding passageways 1220 and extending in radial directions and a main feed pipe 1230 located on the centers of radial feed pipes 1210 for supplying a sheath material 920 thereto, for supplying sheath material 920 through these pipes.

A plurality of multilayer strands can be simultaneously produced by forming extrusion portions with core material extruding passageways 1120 and sheath material extruding passageways 1220 and simultaneously extruding core material 910 and sheath material 920 from the plurality of extrusion portions. Core material extruding passageways 1120 and sheath material extruding passageways 1220 are provided on the circumference so that the same are supplied with core material 910 and sheath material 920 from radially extending plural feed pipes 1110 and 1210 respectively, whereby core material 910 and sheath material 920 are extruded from all core material extruding passageways 1120 and all sheath material extruding passageways 1220 under the same conditions.

Thus, dispersion in thickness etc. of core material 910 and sheath material 920 can be eliminated in all of simultaneously extruded plural multilayer strands 900.

Patent Document 1: Japanese Patent Laying-Open No. 07-171828

Patent Document 2: Japanese Patent Laying-Open No. 59-081121

Patent Document 3: Japanese Patent Laying-Open No. 2001-198918

DISCLOSURE OF THE INVENTION

Problems to be Solved by the Invention

While the extrusion ports are provided on the circumference in the die assembly described in Patent Document 3, the diameter of the circumference on which the extrusion ports are arranged are enlarged when the numbers of the extrusion ports are increased for further improving the productivity. Consequently, the die assembly is so increased in size and weight that handling in setting or exchange of the die assembly is disadvantageously hindered.

The present invention has been proposed in order to solve the aforementioned problems, and an object thereof is to provide a die assembly capable of simultaneously extruding a larger number of multilayer extrusions while suppressing size increase of the die assembly and a process for production of multilayer extrusions with the same.

Means for Solving the Problems

According to the die assembly based on the present invention, a die assembly employed for production of multilayer extrusions each having such a core-sheath structure that a core material is covered with a sheath material on the outer periphery thereof comprises a core material supply port supplied with the aforementioned core material, a sheath material supply port supplied with the aforementioned sheath material, a plurality of extrusion portions having core material extruding passageways located on the central portions thereof for guiding the aforementioned core material in an extrusive direction and sheath material extruding passageways located on outer peripheral portions thereof for guiding the aforementioned sheath material in the extrusive direction for covering the outer periphery of the aforementioned core material with the aforementioned sheath material and extruding the materials, a core material feed passage guiding the aforementioned core material from the aforementioned core material supply port to the core material extruding passageways of the aforementioned extrusion portions and a sheath material feed passage guiding the aforementioned sheath material from the aforementioned sheath material supply port to the sheath material extruding passageways of the aforementioned extrusion portions. The aforementioned plurality of extrusion portions are at least partially arranged on at least two concentric circles having different diameters in plural sets respectively, the aforementioned core material feed passage has a core material feeding layer planarly spreading to communicate with the core material extruding passageways of all the aforementioned extrusion portions and a core material feed pipe having a first end connected onto the central axis of the aforementioned concentric circle of the aforementioned core material feeding layer and a second end connected to the aforementioned core material supply port, and the aforementioned sheath material feed passage has a sheath material feeding layer planarly spreading to communicate with the sheath material extruding passageways of all the aforementioned extrusion portions and a sheath material feed pipe having a first end communicating with the central axis of the aforementioned concentric circle of the aforementioned sheath material feeding layer and a second end connected to the aforementioned sheath material supply port.

According to this die assembly, the aforementioned plurality of extrusion portions are at least partially arranged on at least two concentric circles having different diameters in plural sets respectively, whereby a larger number of extrusion portions can be provided while suppressing size increase of the die assembly as compared with a case of arranging the extrusion portions on a single circumference.

According to the conventional die assembly, the core material and the sheath material have been supplied to respective extrusion portions with radial feed pipes extending in the radial directions, and hence an extremely complicated structure is required for further forming a plurality of extrusion portions inside the circumference on which the extrusion portions are arranged. According to the inventive die assembly, however, the core material and the sheath material are supplied through the planarly spreading core material feeding layer communicating with the core material extruding passageways of all the aforementioned extrusion portions and the planarly spreading sheath material feeding layer communicating with the sheath material extruding passageways of all the aforementioned extrusion portions, whereby the extrusion portions can be provided on arbitrary positions of the planarly spreading core material feeding layer and the planarly spreading sheath material feeding layer. Thus, the die assembly having the plurality of extrusion portions arranged on at least two concentric circles can be easily constituted.

In the aforementioned die assembly, all the aforementioned extrusion portions may be arranged on at least two concentric circles having different diameters. In this case, the extrusion portions arranged on the respective concentric circles fall under the same conditions, whereby an operation such as flow control of the extrusion portions for uniformizing the qualities of a plurality of multilayer extrusions is simplified.

In the aforementioned die assembly, the aforementioned plurality of extrusion portions may be arranged on such positions that extrusions do not come into contact with each other when long extrusions continuously extruded from the plurality of extrusion portions are guided in parallel with each other to be included in a single horizontal plane. While the extrusions extruded from the die assembly may be guided to a unidirectionally extending water tank or the like to be cooled, the extrusions can be prevented from coming into contact with each other in the water tank due to the extrusion portions provided in the aforementioned manner. Thus, insufficiently cooled extrusions can be inhibited from coming into contact with each other, and the same can be prevented from adhering to each other.

The aforementioned extrusion portions may be provided with exchangeable throttle portions limiting the flow rate of the core material guided to the aforementioned core material extruding passageways. While pressures for supplying the core material are different between the extrusion portions provided on the inner peripheral side and the extrusion portions provided on the outer peripheral side, the extrusion rates for the core material can be easily adjusted to be uniform by providing the exchangeable throttle portions.

Multilayer extrusions can be produced by supplying the core material to the core material supply port of the aforementioned die assembly while supplying the sheath material to the sheath material supply port and extruding multilayer extrusions each having such a core-sheath structure that the core material is covered with the sheath material on the outer periphery thereof from the extrusion portions.

EFFECTS OF THE INVENTION

According to the inventive die assembly and the process for production of multilayer extrusions with the same, a larger number of multilayer extrusions can be simultaneously extruded while suppressing size increase of the die assembly.

Figure 1A:
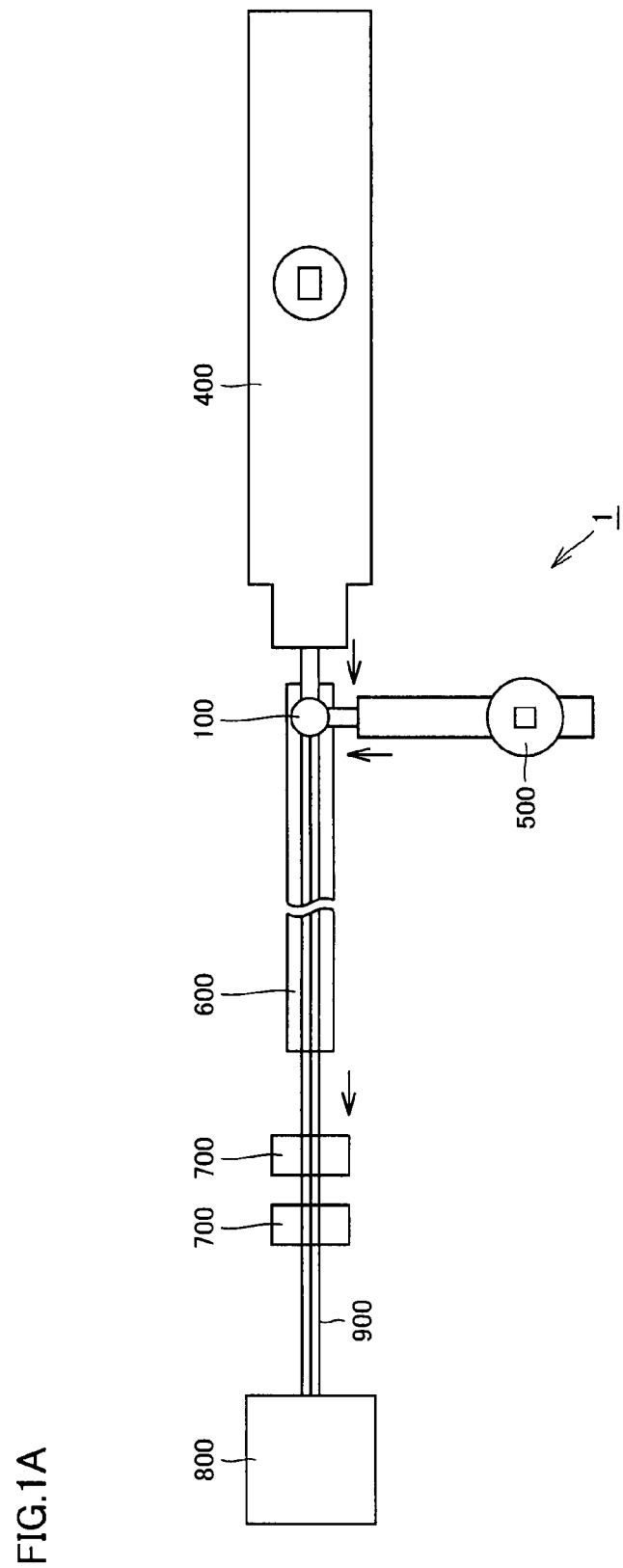
FIG. 1A is a plan view showing the structure of a production unit for multilayer extrusions in an embodiment according to the present invention.

DESCRIPTION OF REFERENCE NUMERALS 1 production unit, 100 die assembly, 111, 112 extrusion port, 141, 142 sheath material extruding passageway, 181 sheath material feeding layer, 182 sheath material feed pipe, 240 core material feed pipe, 251 core material feeding layer, 271, 272 core nozzle, 281, 282 collar, 311 core material supply port, 321 sheath material supply port, 400 core material extruder, 500 sheath material extruder, 600 cooling bath, 900 multilayer strand, 910 core material, 920 sheath material.

BEST MODES FOR CARRYING OUT THE INVENTION

A die assembly according to an embodiment of the present invention and a process for production of multilayer extrusions with the same are now described with reference to the drawings.

Figure 1B:
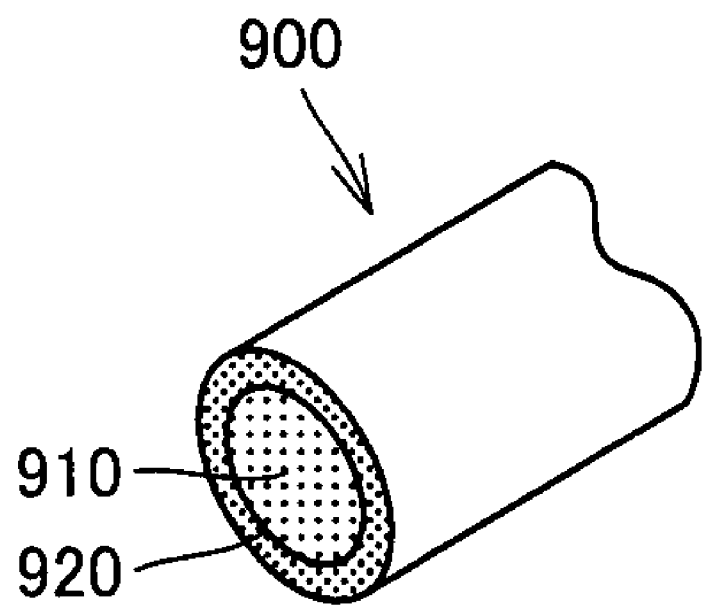
FIG. 1B is a perspective view showing a sectional structure of a strand produced with the production unit for multilayer extrusions in the embodiment according to the present invention.

FIG. 1A is a plan view showing the structure of a production unit for multilayer extrusions according to this embodiment, and FIG. 1B is a perspective view showing a sectional structure of a strand produced with this production unit.

As shown in FIG. 1A, a core material extruder 400 extruding and supplying a core material and a sheath material extruder 500 extruding and supplying a sheath material are connected to a die assembly 100 provided on a production unit 1 from directions orthogonal to each other. A resin raw material for forming the core material is supplied to core material extruder 400, and heated/melted in core material extruder 400. Another resin raw material for forming the sheath material is supplied to and heated/melted in sheath material extruder 500. The heated/melted materials are supplied to die assembly 100.

A plurality of multilayer strands 900 are downwardly extruded from the lower surface of die assembly 100 in parallel with each other. As shown in FIG. 1B, a core material 910 constitutes the central portion of each multilayer strand 900, and a relatively thin sheath material 920 covers the outer periphery thereof Extruded multilayer strands 900 are fed to a cooling bath 600 to be cooled with cooling water and solidified.

Multilayer strands 900 downwardly extruded from die assembly 100 are horizontally turned around in cooling bath 600, and guided in cooling bath 600 along the longitudinal direction thereof At this time, plurality of multilayer strands 900 are guided in parallel with each other to be located in a certain horizontal plane.

Multilayer strands 900 cooled in cooling bath 600 are fed to a pelletizer 800 through a hydro-extractor 700. In pelletizer 800, multilayer strands 900 are finely cut to obtain multilayer pellets. Each multilayer pellet also has a core-sheath sectional structure formed by core material 910 and sheath material 920, as shown in FIG. 1B.

Figure 2:
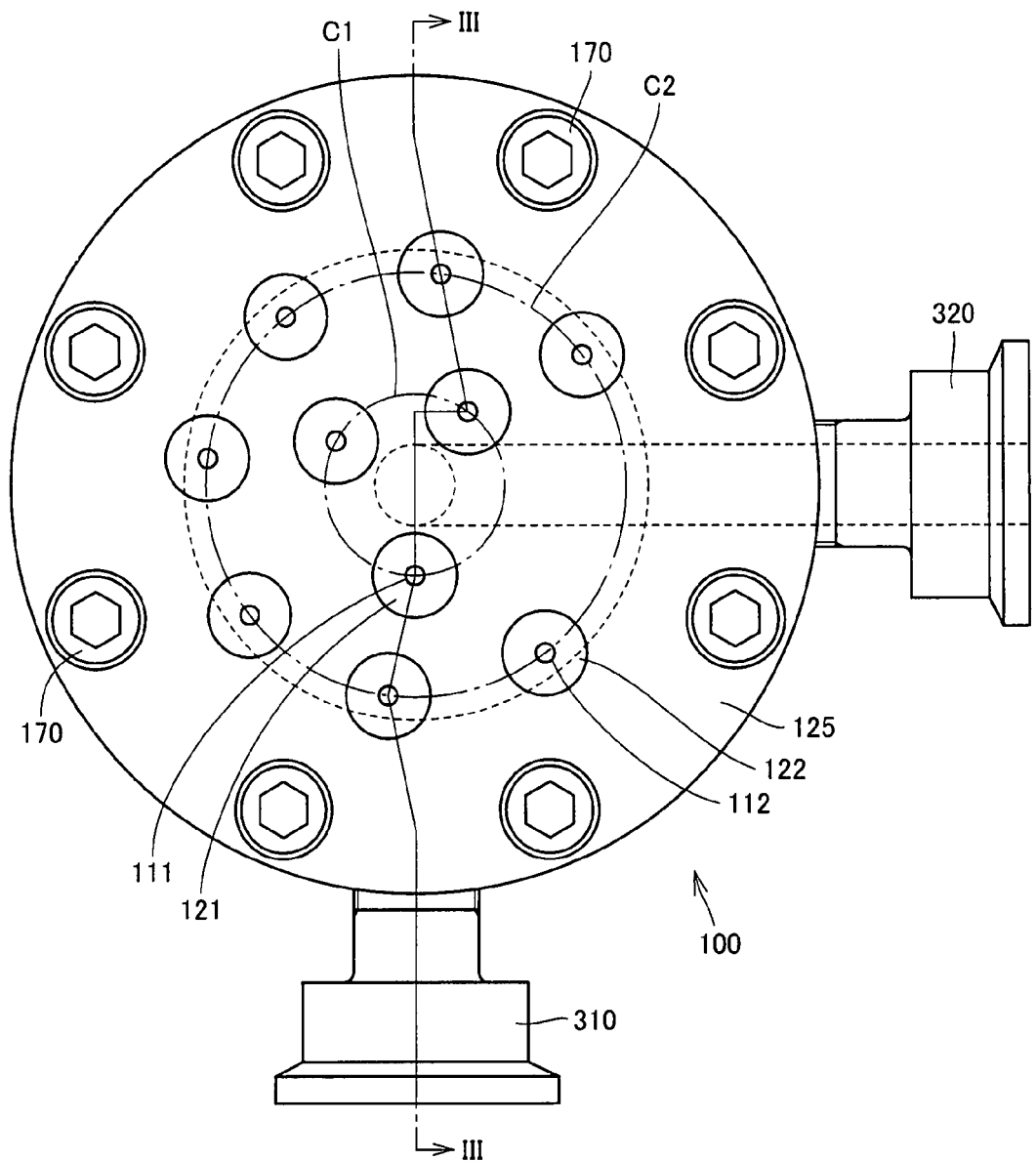
FIG. 2 is a bottom plan view of a die assembly showing the structure of an extrusion surface extruding multilayer strands in the embodiment according to the present invention.
Figure 3:
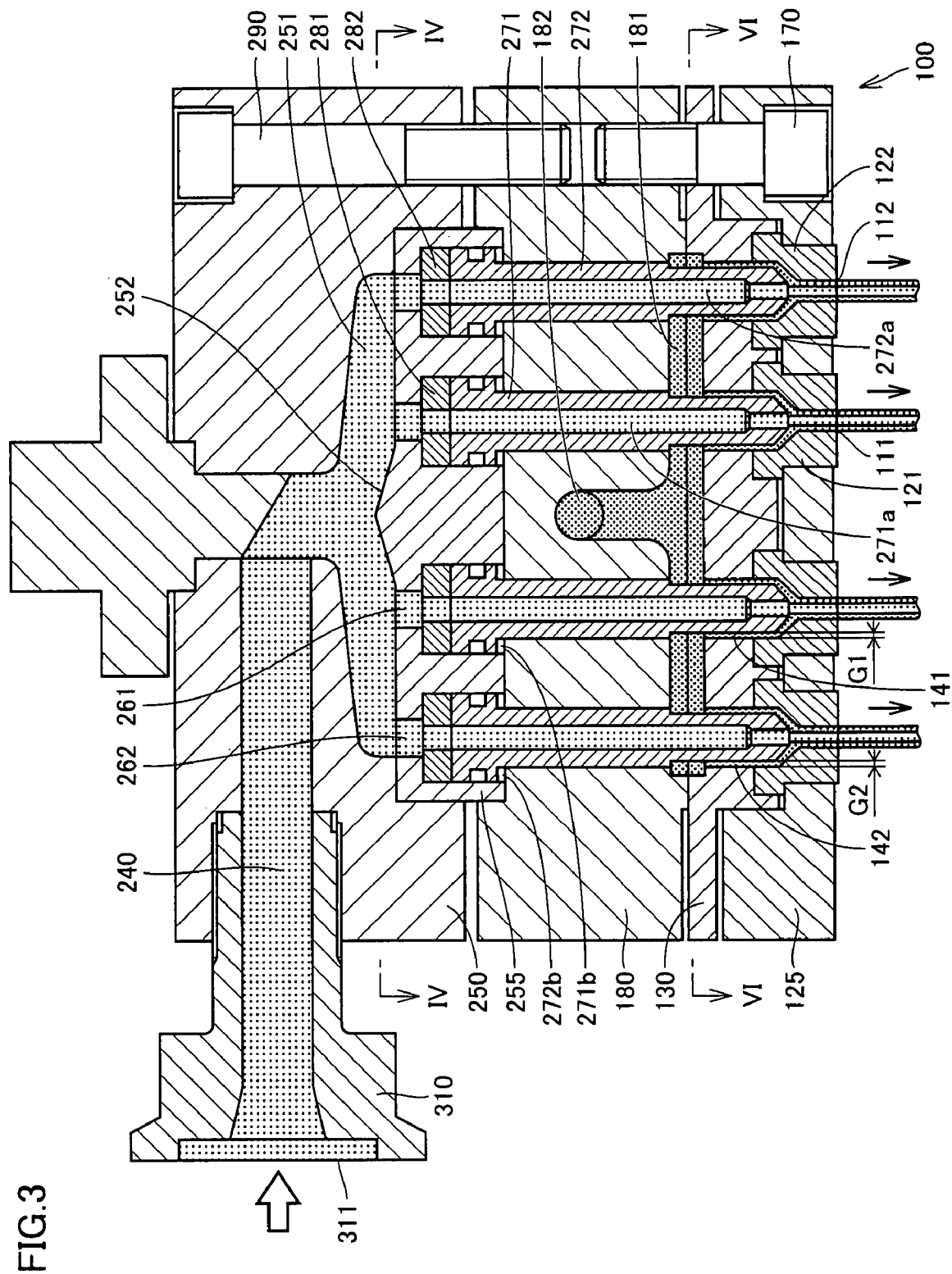
FIG. 3 is a sectional view taken along the line III-III in FIG. 2, showing a longitudinal sectional structure of the die assembly in the embodiment according to the present invention.
Figure 4:
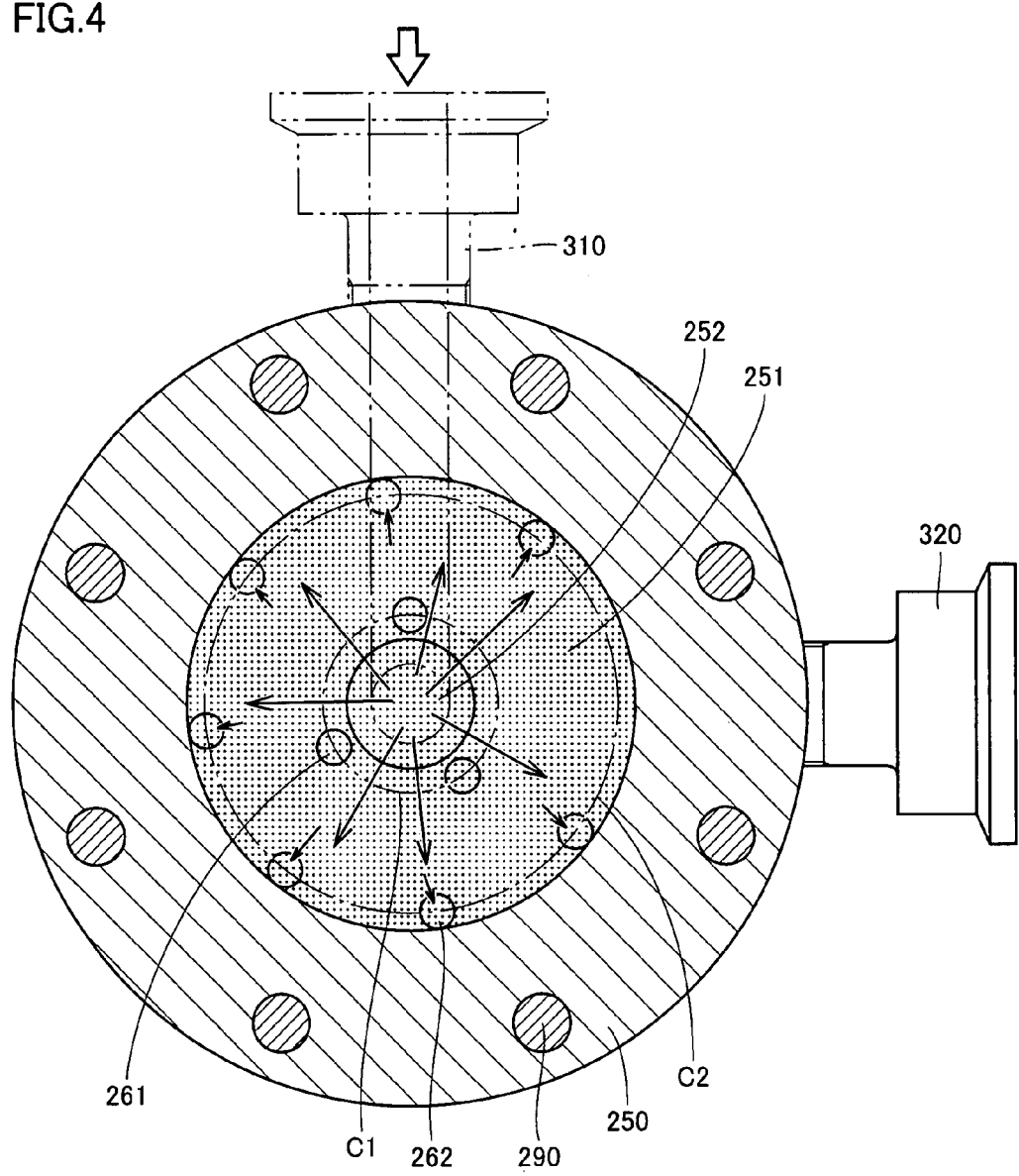
FIG. 4 is a sectional view taken along the line IV-IV in FIG. 3, showing a horizontal sectional structure of the die assembly in the embodiment according to the present invention.
Figure 5:
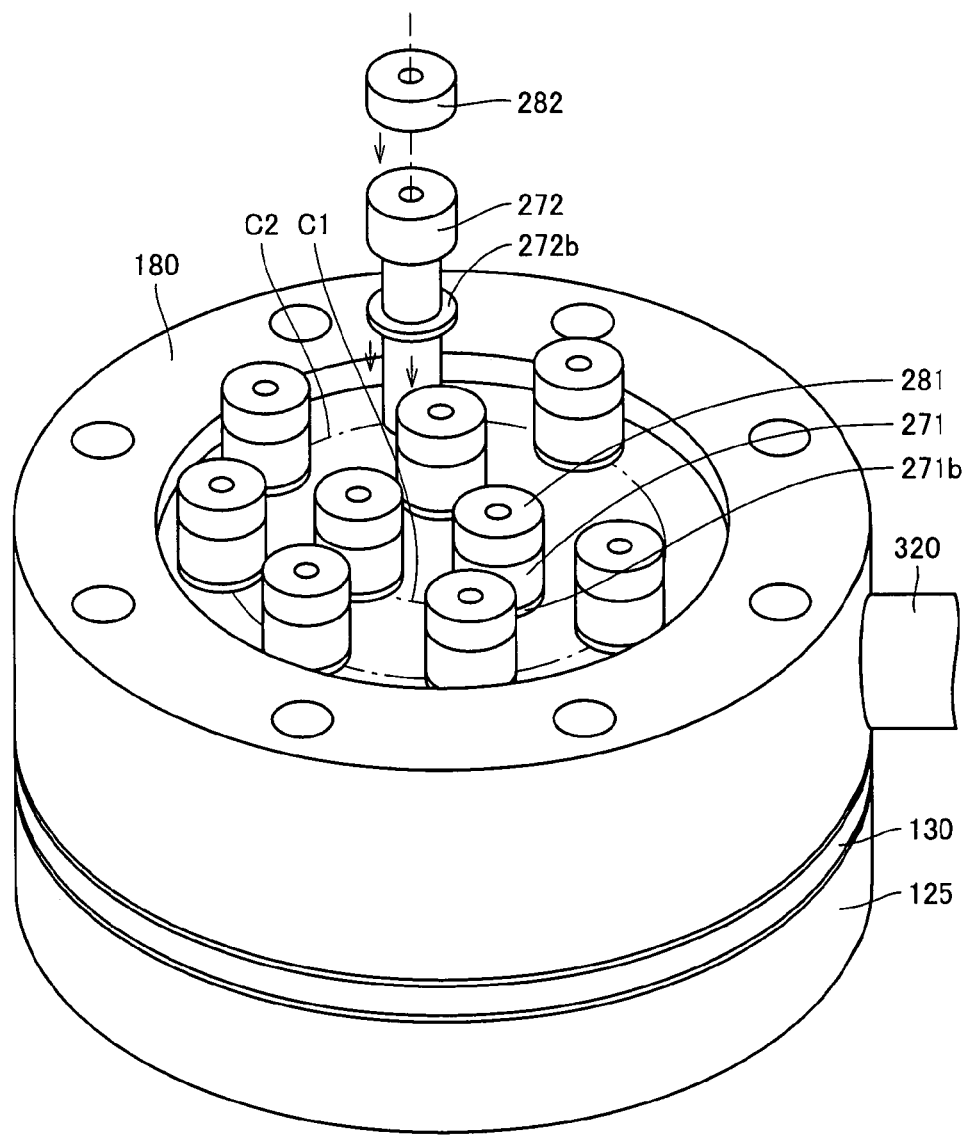
FIG. 5 is a perspective view of the die assembly showing a state where an upper portion of the die assembly in the embodiment of the present invention is removed.
Figure 6:
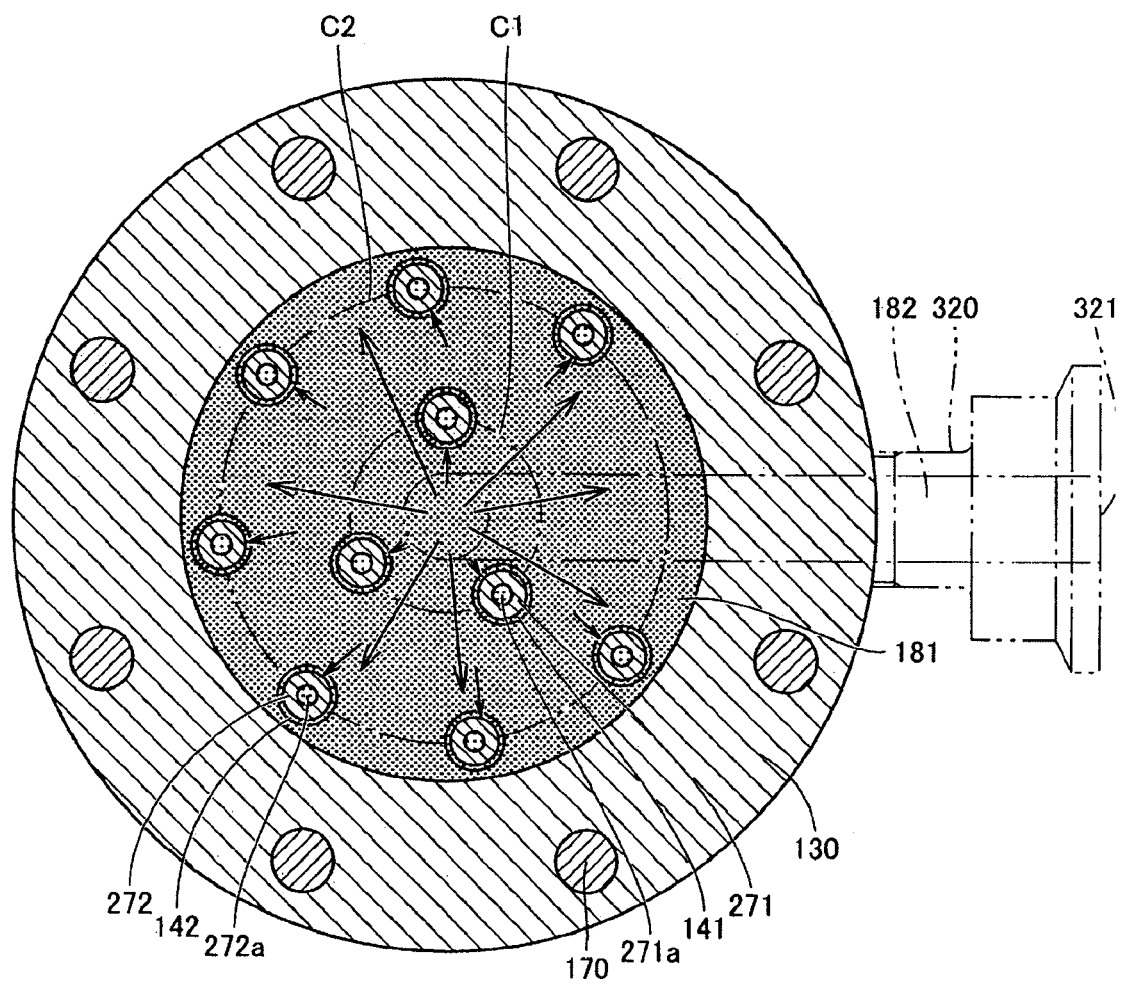
FIG. 6 is a sectional view taken along the line VI-VI in FIG. 3, showing another horizontal sectional structure of the die assembly in the embodiment according to the present invention.

FIG. 2 is a bottom plan view of the die assembly, showing the structure of an extrusion surface extruding the multilayer strands, FIG. 3 is a sectional view taken along the line III-III in FIG. 2, showing a longitudinal sectional structure of the die assembly, FIG. 4 is a sectional view taken along the line IV-IV in FIG. 3, showing a horizontal sectional structure of the die assembly, FIG. 5 is a perspective view of the die assembly, showing a state where an upper portion of the die assembly is removed, and FIG. 6 is a sectional view taken along the line VI-VI in FIG. 3, showing another horizontal sectional structure of the die assembly.

As shown in FIGS. 2 to 5, die assembly 100 has a substantially cylindrical body. As shown in FIG. 2, plural sets of extrusion ports 111 and 112 are provided on two concentric circles C1 and C2 on the bottom surface of die assembly 100 having a circular contour. According to this embodiment, three extrusion ports 111 are set on inner circle C1 of the two concentric circles, while seven extrusion ports 112 are set on outer circle C2. A core material feed cylinder 310 and a sheath material feed cylinder 320 are connected to the peripheral surface of the die assembly body on positions orthogonal to each other.

An opening provided on an end surface of core material feed cylinder 310 constitutes a core material supply port 311 (see FIG. 3), and an opening provided on an end surface of sheath material feed cylinder 320 constitutes a sheath material supply port 321 (see FIG. 6). Core material supply port 311 is connected to core material extruder 400, while sheath material supply port 321 is connected to sheath material extruder 500. Core material extruder 400 is constituted of a twin-screw extruder, while sheath material extruder 500 is constituted of a single-screw extruder.

The die assembly body, roughly divided into three portions in the vertical direction, is constituted of an upper body 250, forming an upper end portion thereof, connected with core material feed cylinder 310, an intermediate body 180, forming an intermediate portion thereof, connected with sheath material feed cylinder 320, and a lower body, forming a lower end portion thereof, consisting of a lower press member 125 and an upper press member 130. All of upper body 250, intermediate body 180 and the lower body are cylindrically formed.

Upper body 250 is fixed to intermediate body 180 with a bolt 290, while the lower body consisting of lower press member 125 and upper press member 130 are fixed to intermediate body 180 with a bolt 170.

A core material feed pipe 240 horizontally extending from core material supply port 311 to upper body 250, bending and further extending downward is formed in upper body 250 and core material feed cylinder 310 connected thereto.

Upper body 250 is formed with a horizontally planarly spreading core material feeding layer 251 connected with core material feed pipe 240 on the center thereof Core material feeding layer 251 has a circular outline, and a conical ridge portion 252 is provided on the center of the inner part thereof Ridge portion 252, opposed to an end of core material feed pipe 240, can smoothly supply the core material supplied from core material feed pipe 240 in the radial directions of core material feeding layer 251.

Through holes 261 and 262 are provided on the bottom surface of core material feeding layer 251 on positions corresponding to extrusion ports 111 and 112 respectively. In other words, three through holes 261 are arranged on inner circle C1, while seven through holes 262 are provided on outer circle C2. The bottom portion of core material feeding layer 251 is constituted of a discoidal member 255 fitted from the lower surface of upper body 250.

Intermediate body 180 is provided with detachably inserted cylindrical core nozzles 271 and 272, as shown in FIG. 5. Upper ends of core nozzles 271 and 272 are enlarged in diameter, while lower portions thereof are temporarily reduced in diameter to extend downward so that the lower ends thereof are downwardly coned. Core nozzles 271 and 272 are provided on the centers thereof with longitudinally extending tubular core material extruding passageways 271a and 272a. Core material extruding passageways 271a and 272a are reduced in diameter on lower ends thereof before merging with sheath material extruding passageways 141 and 142.

Collars 281 and 282 for reducing the flow rates of the core material guided to core material extruding passageways 271a and 272a are arranged on core nozzles 271 and 272 respectively. Collars 281 and 282, which are annular members centrally provided with through holes, can control the flow rates of the core material guided to core material extruding passageways 271a and 272a by varying the diameters of the through holes passing through the central portions. Collars 281 and 282 are inserted into cylindrical recesses provided on the lower surface of upper body 250, and detachable if necessary.

Collar 281 arranged on inner circle C1 and collar 282 arranged on outer circle C2 are prepared from those having through holes of different diameters, so that the flow rate of the core material guided to core material extruding passageways 271a located on inner circle C1 and the flow rate of the core material guided to core material extruding passageways 272a located on outer circle C2 can be equalized to each other.

More specifically, the diameters of the extruded core material can be substantially uniformized by setting the diameter of the through holes of collars 281 arranged on inner circle C1 to at least 55% and not more than 85% of the diameter of the through holes of collars 282 arranged on outer circle C2. Proper values vary in the aforementioned range with the characteristics of the extruded core material, the extrusion rate, the temperature of the core material etc.

Spacers 271b and 272b are provided on the lower surfaces of the portions enlarged in diameter on the upper ends of core nozzles 271 and 272 respectively, so that the lengths of the lower ends of core nozzles 271 and 272 downwardly projecting from intermediate body 180 can be varied by changing the thicknesses of spacers 271b and 272b.

As shown in FIGS. 3 and 6, a sheath material feed pipe 182 horizontally extending, perpendicularly bending and extending downward is provided in intermediate body 180 and sheath material feed cylinder 320 connected to the side surface thereof Intermediate body 180 is formed with a horizontally planarly spreading sheath material feeding layer 181 connected with sheath material feed pipe 182 on the center thereof. Sheath material feeding layer 181 has a cylindrical outline. A conical ridge portion may be provided on the center of the inner part thereof, although the same is not provided in this embodiment.

Sheath material feeding layer 181 is constituted of a discoidal upward recess formed on the lower surface of intermediate body 180 and a discoidal downward recess formed on the upper surface of upper press member 130 forming the lower body, as shown in FIG. 3. A plurality of openings communicating with sheath material extruding passageways 141 and 142 formed on the outer peripheries of core nozzles 271 and 272 are provided on the lower surface of sheath material feeding layer 181, as shown in FIG. 6.

Plural extrusion ports 111 and 112 are provided on the lower surface of the lower body as hereinabove described, and the peripheries of extrusion ports 111 and 112 are constituted of extrusion port forming members 121 and 122. As shown in FIG. 3, extrusion port forming members 121 and 122 have flanges on upper ends thereof, so that the same are fixed to the lower body through these flanges held between upper press member 130 and lower press member 125.

Recesses are formed on the upper surfaces of extrusion port forming members 121 and 122 for receiving the lower ends of core nozzles 271 and 272, while through holes communicating with extrusion ports 111 and 112 are formed on the bottoms of the recesses. Upper portions of the recesses are cylindrical formed while lower portions linked to the through holes are inverse-conically formed, as shown in FIG. 3.

Sheath material extruding passageways 141 and 142 are constituted of clearances between these recesses and the forward ends of core nozzles 271 and 272, so that the flow rates of the extruded sheath material can be controlled by varying thicknesses G1 and G2 of these clearances.

The sheath material supplied to the central portion of sheath material feeding layer 181 through sheath material supply port 321 and sheath material feed pipe 182 radially spreads over sheath material feeding layer 181, to be supplied to sheath material extruding passageways 141 and 142. While conditions for sheath material extruding passageways 141 located on inner circle C1 and sheath material extruding passageways 142 located on outer circle C2 are different from each other due to different distances from the central portion supplied with the sheath material, the flow rates of the sheath material extruded from sheath material extruding passageways 141 and 142 can be equalized to each other on the sides of inner circle C1 and outer circle C2 by varying thicknesses G1 and G2 of the clearances formed between the forward ends of core nozzles 271 and 272 and the recesses of extrusion port forming members 121 and 122.

More specifically, the thicknesses of the extruded sheath material can be uniformized on the sides of inner circle C1 and outer circle C2 by setting thickness G1 of the clearances formed between the forward ends of core nozzles 271 on inner circle C1 and the recesses of extrusion port forming members 121 to at least 85% and not more than 98% of thickness G2 of the clearances formed between the forward ends of core nozzles 272 on outer circle C2 and the recesses of extrusion port forming members 122. Proper values vary in the aforementioned range with the characteristics of the extruded sheath material, the extrusion rate, the temperature of the sheath material etc.

Figure 7:
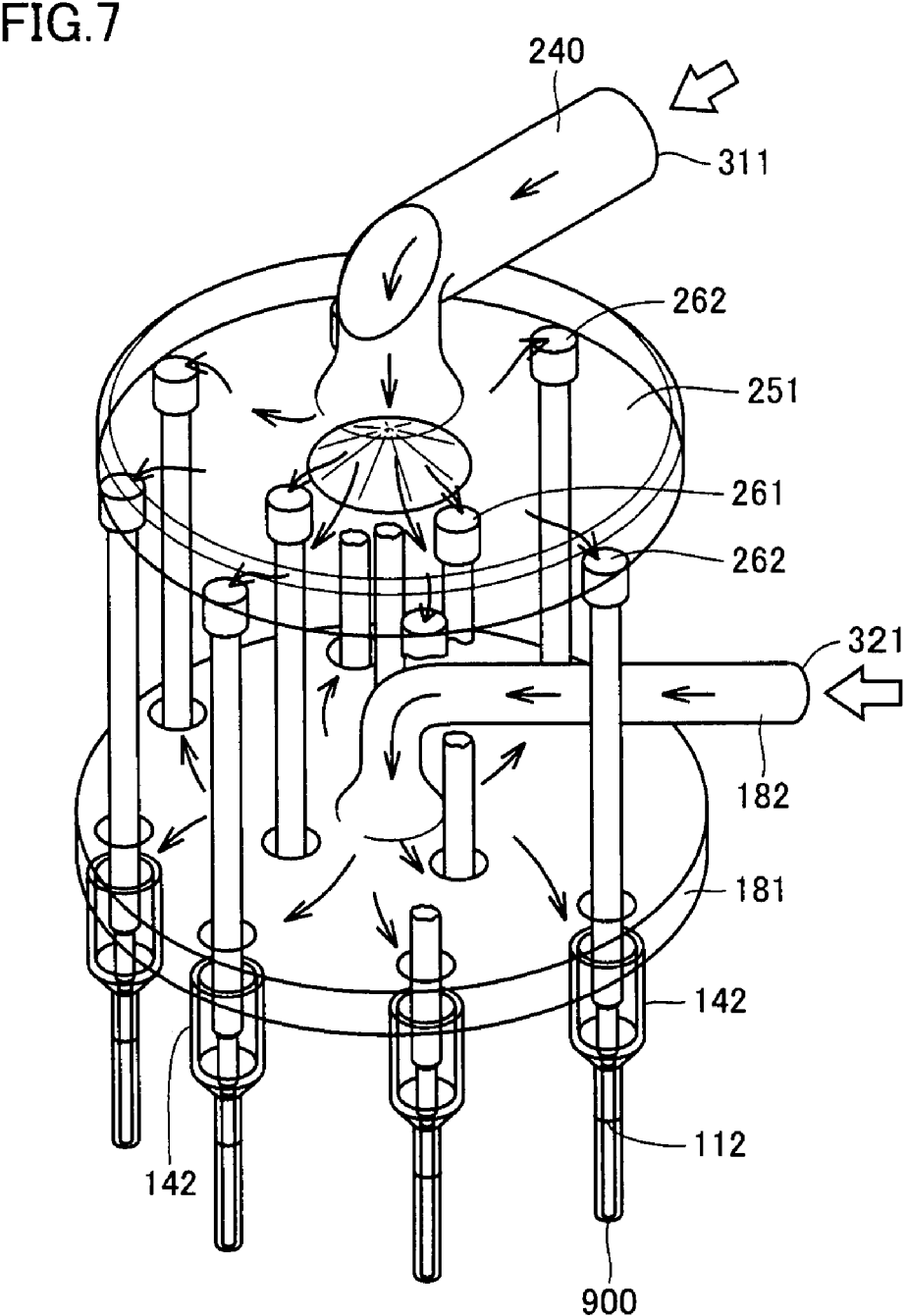
FIG. 7 is a perspective view showing paths up to extrusion of a core material and a sheath material in the embodiment according to the present invention.

FIG. 7 is a perspective view showing paths up to extrusion of the core material and the sheath material. As shown in FIG. 7, the core material supplied to core material supply port 311 is supplied to the center of core material feeding layer 251 through core material feed pipe 240. The supplied core material radially spreads in core material feeding layer 251, to flow into through holes 261 and 262. The core material passing through holes 261 and 262 are guided to core material extruding passageways 271a and 272a on the central portions of core nozzles 271 and 272.

The sheath material supplied to sheath material supply port 321 is supplied to the center of sheath material feeding layer 181 through sheath material feed pipe 182. The supplied sheath material radially spreads in sheath material feeding layer 181, to flow into sheath material extruding passageways 141 and 142.

The core material guided to core material extruding passageways 271a and 272a and the sheath material guided to sheath material extruding passageways 141 and 142 merge with each other before passing through extrusion ports 121 and 122, to form multilayer strands 900 of the core material covered with the sheath material on the outer peripheral side thereof.

Figure 8:
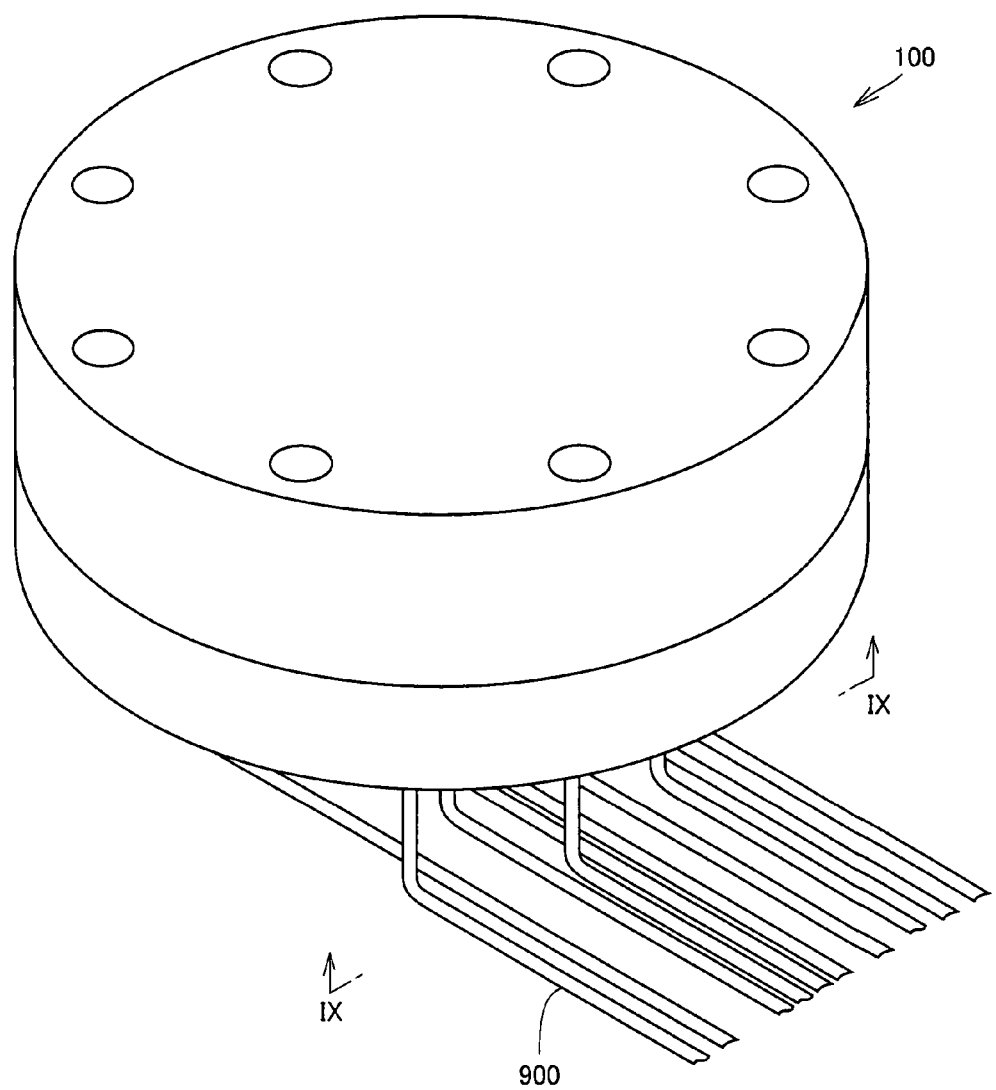
FIG. 8 is a perspective view for illustrating a direction for guiding multilayer strands extruded from the die assembly in the embodiment according to the present invention.
Figure 9:
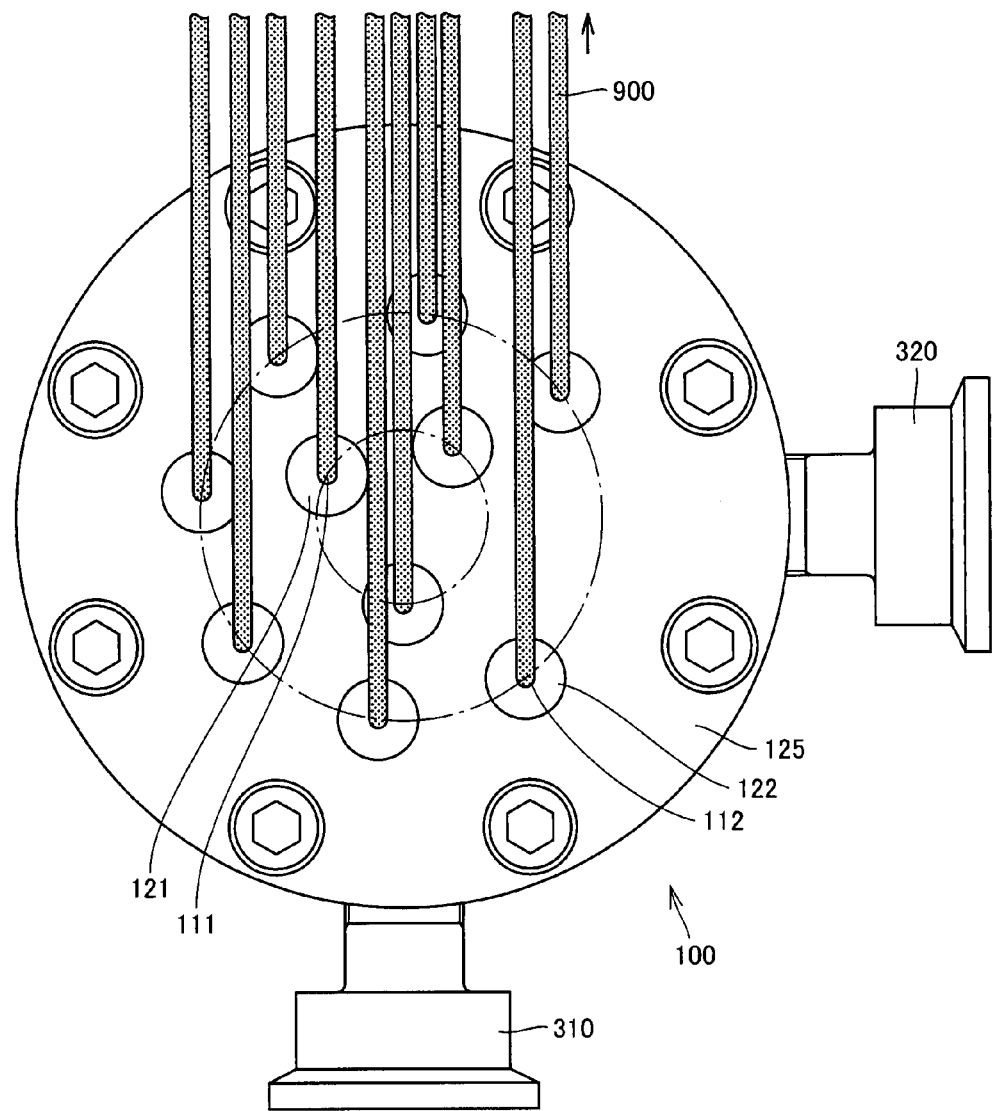
FIG. 9 is a diagram, illustrating the die assembly as viewed from the side of the lower surface, showing the direction for guiding the multilayer strands extruded from the die assembly in the embodiment according to the present invention.
Figure 10A:
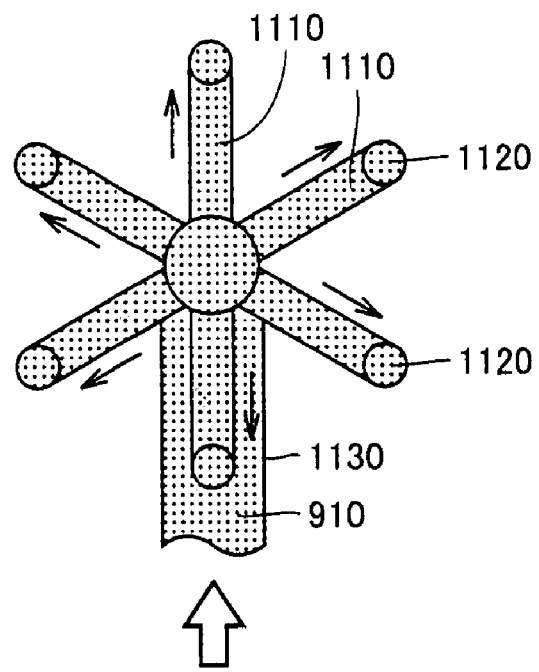
FIG. 10A illustrates the structure of a die assembly according to prior art.
Figure 10B:
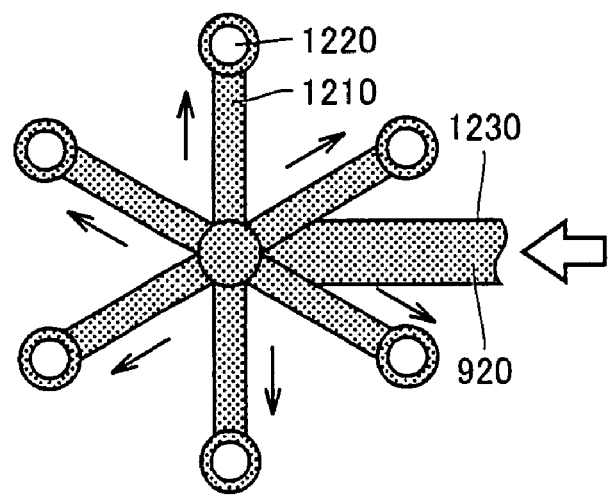
FIG. 10B illustrates the structure of the die assembly according to the prior art.

FIG. 8 is a perspective view for illustrating a direction for guiding the multilayer strands extruded from the die assembly according to this embodiment, and FIG. 9 illustrates the die assembly as viewed from the side of the lower surface.

Extruded plurality of multilayer strands 900, cooled with the cooling water in cooling bath 600, are guided in parallel with each other to be located in the certain horizontal plane in cooling bath 600, as shown in FIG. 8.

In die assembly 100 according to this embodiment, extrusion ports 111 and 112 are arranged on such positions that multilayer strands 900 do not come into contact with each other as shown in FIG. 9, whereby multilayer strands 900 can be prevented from coming into contact with each other in cooling bath 600. Thus, insufficiently cooled multilayer strands 900 can be prevented from adhering to each other.

Multilayer strands 900 may be cut into pellets with pelletizer 800, or may be used in the form of strands. Further, multilayer strands 900 extruded from die assembly 100 may be successively cut with a cutter rotating on the extrusion surface of die assembly 100. In this case, an underwater cut system of cutting the same while covering the extrusion surface of the die assembly with water and immediately cooling the same may be employed, or a hot cut system of cutting the same without specific cooling may be employed.

As hereinabove described, plural sets of extrusion ports 111 and 112 are arranged on two concentric circles C1 and C2 having different diameters respectively in die assembly 100 according to this embodiment, whereby a larger number of extrusion ports 111 and 112 can be provided while inhibiting die assembly 100 from size increase as compared with a case of arranging a plurality of extrusion ports on a single circumference.

Further, the core material and the sheath material are supplied through planarly spreading core material feeding layer 251 communicating with all core material extruding passageways 271a and 272a and planarly spreading sheath material feeding layer 181 communicating with all sheath material extruding passageways 141 and 142, whereby extrusion ports 111 and 112 can be provided on arbitrary positions corresponding to planarly spreading core material feeding layer 251 and sheath material feeding layer 181, and die assembly 100 can be easily formed by arranging plural sets of extrusion ports 111 and 112 on two concentric circles C1 and C2.

While extrusion ports 111 and 112 are arranged on two concentric circles in this embodiment, plural sets of extrusion ports may alternatively be arranged on at least three concentric circles respectively.

In die assembly 100 according to this embodiment, all extrusion ports 111 and 112 are arranged on two concentric circles C1 and C2, whereby extrusion ports 111 and 112 arranged on respective concentric circles C1 and C2 fall under the same conditions. Thus, an operation such as flow control for uniformizing the qualities of the plurality of multilayer extrusions is simplified.

However, not all extrusion ports 111 and 112 may be arranged on the concentric circles but partial extrusion ports may deviate from the concentric circles due to piping routes or the like.

Specific examples of multilayer pellets produced with die assembly 100 described with reference to the above embodiment are now described. The inner diameters of collars 281 and 282 and the outer diameters of the forward ends of core nozzles 271 and 272 were varied with inner circle C1 and outer circle C2, for evaluating current discharge stability values of respective strands. Low-density polyethylene resin (MFR=4) was supplied at a discharge of 50 kg/h as the core material and the sheath material.

The diameters of inner circle C1 and the outer circle of the die assembly employed for Example 1 and comparative examples 1 and 2 are 46 mm and 110 mm respectively, and the inner diameter of the extrusion port forming members receiving the core nozzles is 15 mm.

Table 1 shows the inner diameters of respective collars and the outer diameters of core nozzles of Example 1 and comparative examples 1 and 2 and experimental results.

TABLE 1

|  | Example 1 | Comparative Example 1 | Comparative Example 2 |
|---|---|---|---|
| Inner Diameter of Collar on the Side of Inner Circle C1 (mm) | 5.0 | 7.0 | 3.0 |
| Inner Diameter of Collar on the Side of Outer Circle C2 (mm) | 7.0 | 7.0 | 7.0 |
| Outer Diameter of Forward End of Core Nozzle on the Side of Inner Circle C1 (mm) | 12.2 | 12.0 | 12.5 |
| Outer Diameter of Forward End of Core Nozzle on the Side of Outer Circle C2 (mm) | 12.0 | 12.0 | 12.0 |
| Discharge per Extrusion Port on the Side of Inner Circle C1 (kg/h) | 5.0 | 6.2 | 4.0 |
| Discharge per Extrusion Port on the Side of Outer Circle C2 (kg/h) | 5.0 | 4.0 | 6.0 |
| Discharge Stability | excellent | defective | defective |

As shown in Table 1, the discharges of the respective multilayer strands were rendered constant on the sides of inner circle C1 and outer circle C2 to attain excellent discharge stability by setting the inner diameters of collars 281 and 282 on the sides of inner circle C1 and outer circle C2 to 5.0 mm and 7.0 mm respectively while setting the outer diameters of the forward ends of core nozzles 271 and 272 on the sides of inner circle C1 and outer circle C2 to 12.2 mm and 12.0 mm respectively.

In the case of setting both inner diameters of collars 281 and 282 on the sides of inner circle C1 and outer circle C2 to 7.0 mm while setting both outer diameters of the forward ends of core nozzles 271 and 272 on the sides of inner circle C1 and outer circle C2 to 12.0 mm shown in comparative example 1, to the contrary, the discharges of multilayer strands 900 were not rendered constant on the sides of inner circle C1 and outer circle C2. At this time, the ratio of the inner diameter of collars 281 to the inner diameter of collars 282 reaches 100%, and the ratio of thickness G1 to thickness G2 of the clearances shown in FIG. 3 reaches 100%.

Also in the case of setting the inner diameters of collars 281 and 282 on the sides of inner circle C1 and outer circle C2 to 3.0 mm and 7.0 mm respectively while setting the outer diameters of the forward ends of core nozzles 271 and 272 on the sides of inner circle C1 and outer circle C2 to 12.5 mm and 12.0 mm respectively shown in comparative example 2, the discharges of multilayer strands 900 remained inconstant on the sides of inner circle C1 and outer circle C2. At this time, the ratio of the inner diameter of collars 281 to the inner diameter of collars 282 reaches 43%, and the ratio of thickness G1 to thickness G2 of the clearances reaches 83%.

It is understood from these that the ratio of the inner diameter of collars 281 to the inner diameter of collars 282 is preferably at least 55% and not more than 85%, and the ratio of thickness G1 to thickness G2 of the clearances is preferably at least 85% and not more than 98%, as hereinabove described.

The aforementioned embodiment disclosed this time is illustrative in all points, and does not found any restrictive interpretation. Therefore, the technical scope of the present invention is not interpreted through only the aforementioned embodiment, but defined on the basis of the description of the scope of claim for patent. Further, all modifications within the meaning and range equivalent to the scope of claim for patent are included.

INDUSTRIAL AVAILABILITY

According to the inventive die assembly and the process for production of multilayer extrusions with the same, a die assembly employed for production of multilayer extrusions each having such a core-sheath structure that a core material is covered with a sheath material on the outer periphery thereof can be constructed, so that multilayer extrusions of the core-sheath structure can be produced with the same.

The invention claimed is:

1. A die assembly employed for production of multilayer extrusions each having such a core-sheath structure that a core material is covered with a sheath material on the outer periphery thereof, comprising:
   a core material supply port supplied with said core material;
   a sheath material supply port supplied with said sheath material;
   a plurality of extrusion portions having core material extruding passageways located on the central portions thereof for guiding said core material in an extrusive direction and sheath material extruding passageways located on outer peripheral portions thereof for guiding said sheath material in the extrusive direction for covering the outer periphery of said core material with said sheath material and extruding the materials;
   a core material feed passage guiding said core material from said core material supply port to the core material extruding passageways of said extrusion portions; and
   a sheath material feed passage guiding said sheath material from said sheath material supply port to the sheath material extruding passageways of said extrusion portions, wherein
   said plurality of extrusion portions are at least partially arranged on at least two concentric circles having different diameters in plural sets respectively,
   said core material feed passage has a core material feeding layer planarly spreading to communicate with the core material extruding passageways of all said extrusion portions and a core material feed pipe having a first end connected onto the central axis of said concentric circle of said core material feeding layer and a second end connected to said core material supply port,
   said sheath material feed passage has a sheath material feeding layer planarly spreading to communicate with the sheath material extruding passageways of all said extrusion portions and a sheath material feed pipe having a first end communicating with the central axis of said concentric circle of said sheath material feeding layer and a second end connected to said sheath material supply port,
   said extrusion portions are provided with flow rate control portions respectively narrowing flow paths of the core material extruding passageways and flow paths of the sheath material extruding passageways, and
   said flow rate control portions narrow the flow paths such that the flow paths of the core material extruding passageways and the flow paths of the sheath material extruding passageways of the extruding portions arranged on an inner circle of said concentric circles are narrower than the flow paths of the core material extruding passageways and the flow paths of the sheath material extruding passageways of the extruding portions arranged on an outer circle of said concentric circles, respectively,
   wherein exchangeable throttle portions are provided as said flow rate control portions narrowing the flow paths of said core material extruding passageways, and
   wherein said throttle portions are formed by collars, which are annular members centrally provided with through holes and can control flow rates of the core material guided to said core material extruding passageways by varying the diameters of said through holes.

2. The die assembly according to claim 1, wherein all said extrusion portions are arranged on at least two concentric circles having different diameters.

3. The die assembly according to claim 1, wherein said plurality of extrusion portions are arranged on such positions that extrusions do not come into contact with each other when long extrusions continuously extruded from plural said extrusion portions are guided in parallel with each other to be included in a single horizontal plane.

4. A process for production of multilayer extrusions with said die assembly according to claim 1, including the steps of:
   supplying the core material to said core material supply port while supplying the sheath material to said sheath material supply port; and
   extruding multilayer extrusions each having such a core-sheath structure that the core material is covered with the sheath material on the outer periphery thereof from said extrusion portions.

* * * * *